United States Patent [19]

Yokoyama et al.

[11] Patent Number: 5,371,139

[45] Date of Patent: Dec. 6, 1994

[54] SILICONE RUBBER MICROSUSPENSION AND METHOD FOR ITS PREPARATION

[75] Inventors: Noriyasu Yokoyama, Tokyo; Yoshitsugu Morita, Chiba, both of Japan

[73] Assignee: Dow Corning Toray Silicone Co., Ltd., Tokyo, Japan

[21] Appl. No.: 901,313

[22] Filed: Jun. 19, 1992

[30] Foreign Application Priority Data

Jun. 21, 1991 [JP] Japan .................. 3-177644

[51] Int. Cl.$^5$ .............................................. C08K 5/06
[52] U.S. Cl. ............................ 524/755; 524/773; 524/837; 524/861; 524/862; 524/588
[58] Field of Search ............... 524/837, 861, 862, 755, 524/773, 588

[56] References Cited

U.S. PATENT DOCUMENTS

| B1 4,742,142 | 9/1991 | Shimizu et al. | 528/15 |
|---|---|---|---|
| 4,248,751 | 2/1981 | Willing | 260/29.2 |
| 4,761,454 | 8/1988 | Oba et al. | 524/862 |
| 4,814,376 | 3/1989 | Tanaka et al. | 524/588 |
| 4,874,547 | 10/1989 | Narula | 252/312 |
| 4,880,882 | 11/1989 | Morita et al. | 525/446 |
| 4,935,464 | 6/1990 | Ona et al. | 524/837 |
| 4,940,743 | 7/1990 | Grape et al. | 524/837 |
| 5,039,724 | 8/1991 | Demlehner et al. | 524/837 |
| 5,082,891 | 1/1992 | Morita et al. | 525/403 |

FOREIGN PATENT DOCUMENTS

| 0463431A2 | 6/1991 | European Pat. Off. | C08J 3/03 |
|---|---|---|---|
| 306471 | 12/1989 | Japan . | |
| 1191289 | 5/1970 | United Kingdom | 524/837 |

OTHER PUBLICATIONS

Paul Becher, *Emulsions: Theory and Practice,* 1966, p. 248.

*Primary Examiner*—Ralph H. Dean
*Assistant Examiner*—Karen A. Dean
*Attorney, Agent, or Firm*—Robert L. McKellar

[57] ABSTRACT

The present invention relates to a silicone rubber microsuspension which has an excellent high-concentration storage stability, and to a method for the preparation of a silicone rubber microsuspension. The silicone rubber microsuspension comprises a microparticulate silicone rubber having an average particle diameter not exceeding 10 micrometers, a nonionic surfactant whose HLB value is less than 10, a nonionic surfactant whose HLB value is at least 10, and water, with the proviso that the content of the microparticulate silicone rubber in the silicone rubber microsuspension is at least 50 weight percent. The method for the preparation of said silicone rubber microsuspension comprises mixing a liquid silicone rubber composition, a nonionic surfactant having an HLB value of less than 10, a nonionic surfactant having an HLB value of at least 10, and water.

20 Claims, No Drawings

SILICONE RUBBER MICROSUSPENSION AND METHOD FOR ITS PREPARATION

BACKGROUND OF THE INVENTION

The present invention relates to a silicone rubber microsuspension and to a method for the preparation thereof. More particularly, the present invention relates to a silicone rubber microsuspension which has an excellent high-concentration storage stability and to a method for the preparation thereof.

Removal of water from a silicone rubber microsuspension yields a microparticulate silicone rubber, which itself can be employed as an internal stress-relaxing material, lubricant, or filler for organic resin. This application requires that the silicone rubber microsuspension have an excellent storage stability at high concentrations and that its silicone rubber have a small average particle diameter.

Silicone rubber microsuspensions prepared by mixing a liquid silicone rubber composition with a surfactant and water in order to prepare an emulsion of said liquid silicone rubber composition and by subsequently curing said liquid silicone rubber composition have been described in Japanese Patent Publication Number 58-17226 [17,226/83], Japanese Patent Application Laid-Open [Kokai or Unexamined] Number 62-243621 [243,621/87], and Japanese Patent Application Laid-Open [Kokai or Unexamined] Number 01-306471 [306,471/89].

However, these prior methods are unable to produce a highly storage-stable, high-concentration silicone rubber microsuspension in which the silicone rubber has a small average particle diameter.

As a result of extensive efforts directed at solving the aforementioned problems, the present inventors have discovered a silicone rubber microsuspension which is free of these problems and a method for the preparation of same, based on the use of at least two types of nonionic surfactants with different HLB (hydrophilic-lipophilic balance) values. The present invention was achieved based on this finding.

SUMMARY OF THE INVENTION

The present invention takes as its object the introduction of a silicone rubber microsuspension whose average silicone rubber particle size does not exceed 10 micrometers, which contains at least 50 weight percent silicone rubber, and which is highly storage stable at high concentrations. A further object of the present invention is a method for the preparation of the silicone rubber microsuspension.

DETAILED DESCRIPTION OF THE INVENTION

The present invention relates to a silicone rubber microsuspension composition which comprises: (A) a microparticulate silicone rubber having an average particle diameter not exceeding 10 micrometers, (B) a nonionic surfactant having an HLB value of less than 10, (C) a nonionic surfactant having an HLB value of at least 10, and (D) water with the proviso that component (A) comprises at least 50 weight percent of the total composition. The present invention further relates to a method for the preparation of a silicone rubber microsuspension comprising the steps of (I) mixing: (A) a liquid silicone rubber composition, (B) a nonionic surfactant having an HLB value of less than 10, (C) a nonionic surfactant having an HLB value of at least 10, and (D) water, wherein the total quantity of components (B) plus (C) plus (D) is from 1 to 100 weight parts per 100 weight parts component (A); (II) forming an emulsion of said liquid silicone rubber composition; and (III) curing said liquid silicone rubber composition.

In accordance with the present invention, HLB (Hydrophile-Lipophile Balance) denotes the relative simultaneous attraction of an emulsifier for two phases of an emulsion system (such as the attraction of an emulsifier for water and for oil).

The silicone rubber microsuspension according to the present invention is delineated as follows. The silicone rubber comprising component (A) is a microparticulate whose average particle size does not exceed 10 micrometers, and it is present in a dispersed state in component (D). Furthermore, the component (A) content is at least 50 weight percent, while concentrations preferred for practical applications fall into the range of 50 to 90 weight percent and particularly 50 to 70 weight percent. When component (A) is to be used as an internal stress-relaxing material, lubricant, or filler for organic resin, the silicone rubber preferably contains an epoxy group-containing organic compound or an aryl group-containing organic compound, and silicone rubber particularly preferred for this application will contain the epoxy or aryl group bonded to silicon across a divalent organic group.

Component (B) a comprises nonionic surfactant having an HLB value of less than 10, and this component is concretely exemplified by polyoxyethylene nonylphenyl ethers, polyoxyethylene trimethylnonyl ethers, polyoxyethylene sorbitan stearate esters, and the like. Two or more of the preceding may be employed as this component.

Component (C) comprises a nonionic surfactant having an HLB value of at least 10, and this component is exemplified by polyoxyethylene octylphenyl ethers, polyoxyethylene trimethylnonyl ethers, polyoxyethylene sorbitan stearate esters, and the like. Two or more of the preceding may be employed as this component. The difference between the HLB values of components (B) and (C) in the present invention is preferably at least 5 because this supports the preparation of a microparticulate silicone rubber with a small average particle size and affords a silicone rubber microsuspension with a particularly good storage stability. The combined quantity of components (B) plus (C) is not specifically restricted, but is preferably 10 to 100 weight parts per 100 weight parts component (A) and more preferably 20 to 50 weight parts per 100 weight parts component (A). The silicone rubber microsuspension according to the present invention is characterized by an excellent storage stability, even in the face of its elevated silicone rubber concentration of at least 50 weight percent, because it employs nonionic surfactants having the specified HLB values as components (B) and (C).

Component (D) is the dispersion medium for the silicone rubber microsuspension of the present invention. In addition to components (A) through (D), the silicone rubber microsuspension according to the present invention may contain those additives known in the art for use in silicone oil emulsions, for example, preservatives in order to prevent emulsion degradation, thickeners, dyes, and the like.

The present invention also relates to a method for preparation of a silicone rubber microsuspension which is delineated as follows. The liquid silicone rubber composition comprising component (A) in the method of the present invention is exemplified (i) by addition-reaction-curing liquid silicone rubber compositions which cure by an addition reaction in the presence of a platinum-type catalyst and (ii) by condensation-reaction-curing liquid silicone rubber compositions which cure by a condensation reaction in the presence of an organotin compound or an organotitanium compound. The addition-reaction-curing liquid silicone rubber compositions are preferred. Said addition-reaction-curing liquid silicone rubber composition preferably consists of (a) an organopolysiloxane having at least 2 silicon-bonded lower alkenyl groups in each molecule, (b) an organohydrogenpolysiloxane having at least 2 silicon-bonded hydrogen atoms in each molecule, and (c) a platinum-type catalyst. An even more preferred liquid silicone rubber composition consists of (a) an organopolysiloxane having at least 2 silicon-bonded lower alkenyl groups in each molecule, (b) an organohydrogenpolysiloxane having at least 2 silicon-bonded hydrogen atoms in each molecule, (c) a platinum-type catalyst, and (d) an epoxy group-containing compound or aryl-group containing compound.

Component (a) described hereinabove is the principal or base material of component (A) in the method of the present invention, and comprises organopolysiloxane which contains at least 2 silicon-bonded lower alkenyl groups in each molecule. The molecular structure of component (a) should be straight chain, partially branched straight chain, or a mixture thereof; however, a straight chain molecular structure is preferred. The viscosity of component (a) at 25° C. is not specifically restricted as long as component (A) can form an emulsion, and in concrete terms range from 1 centipoise to the high viscosities associated with gums. This viscosity preferably falls into the range of 50 to 100,000 centipoise and particularly preferably into the range of 50 to 10,000 centipoise.

The silicon-bonded lower alkenyl group in component (a) is concretely exemplified by vinyl, allyl, propenyl, butenyl, pentenyl, hexenyl, and decenyl, and the vinyl group is preferred in particular. Other than the lower alkenyl group, the organic groups bonded to silicon in component (a) comprise monovalent hydrocarbon groups (excluding lower alkenyl groups) as concretely exemplified by alkyl groups such as methyl, ethyl, propyl, and butyl; cycloalkyl groups such as cyclopentyl and cyclohexyl; aryl groups such as phenyl and xylyl; aralkyl groups such as 2-phenylethyl and 3-phenylpropyl; and halogenated hydrocarbon groups such as 3-chloropropyl and 3,3,3-trifluoropropyl. The silicon-bonded lower alkenyl groups may be bonded at any position in the component (a) molecule, but preferably are bonded at least at the molecular chain terminals.

Component (b), the crosslinker in component (A) in the method of the present invention, comprises organohydrogenpolysiloxane which contains at least 2 silicon-bonded hydrogen atoms in each molecule. The molecular structure of component (b) should be straight chain, cyclic, network, partially branched straight chain, or mixture thereof. The viscosity of component (b) at 25° C. is not specifically restricted as long as component (A) can form an emulsion, and in concrete terms preferably falls within the range of 1 to 10,000 centipoise.

The silicon-bonded organic groups in component (b) comprise monovalent hydrocarbon groups (excluding lower alkenyl groups) as concretely exemplified by alkyl groups such as methyl, ethyl, propyl, and butyl; cycloalkyl groups such as cyclopentyl and cyclohexyl; aryl groups such as phenyl and xylyl; aralkyl groups such as 2-phenylethyl and 3-phenylpropyl; and halogenated hydrocarbon groups such as 3-chloropropyl and 3,3,3-trifluoropropyl.

Component (c) is a platinum-type catalyst of the addition reaction between component (a) and component (b), and comprises those platinum-type catalysts known in the art as hydrosilylation-reaction catalysts, e.g., chloroplatinic acid, alcohol solutions of chloroplatinic acid, complexes between chloroplatinic acid and aliphatically unsaturated hydrocarbon compounds, chloroplatinic acid/alkenylsiloxane complexes, platinum black, platinum-on-silica, and the like.

In addition to the components (a) to (c) described hereinbefore, component (A) preferably contains (d) an epoxy group-containing organic compound or aryl group-containing organic compound for the purpose of improving the affinity and bonding between the silicone rubber and organic resin. Said epoxy group-containing organic compound is exemplified by allyl glycidyl ether, vinylcyclohexene monoepoxide, glycidyl acrylate, glycidyl methacrylate

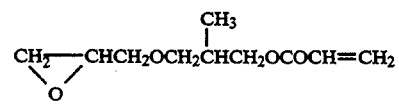

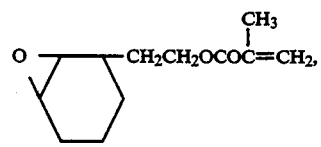

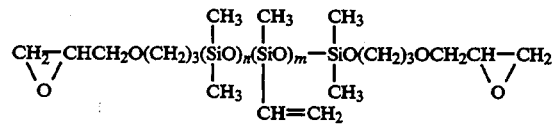

(n and m are integers). The aryl group-containing organic compound is exemplified by

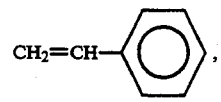

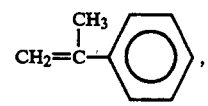

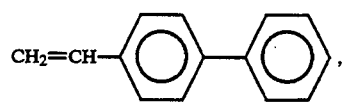

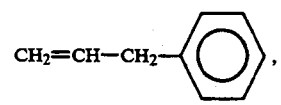

-continued

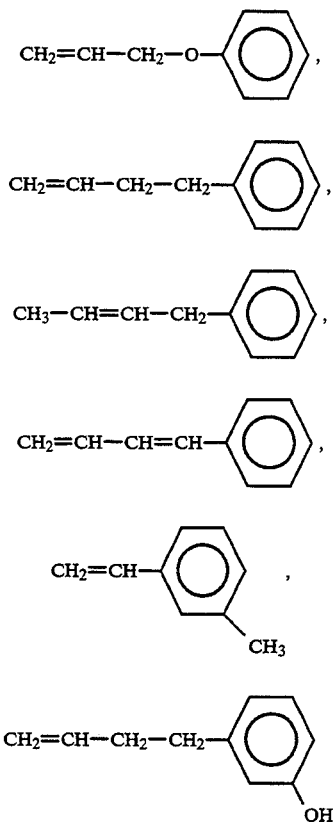

Range for m is 1 to 100.
Range for n is 1 to 100.

This component (d) can be admixed at the same time that components (a) to (c) are mixed with one another, or it can be preliminarily addition-reacted with component (b).

A filler can be admixed in order to regulate the fluidity of component (A) in the method of the present invention or increase the mechanical strength of the silicone rubber. Fillers suitable in this regard are concretely exemplified by reinforcing fillers such as precipitated silica, fumed silica, calcined silica, and fumed titanium oxide, and by nonreinforcing fillers such as powdered quartz, diatomaceous earth, asbestos, aluminosilicic acid, iron oxide, zinc oxide, and calcium carbonate. Although the preceding fillers can be directly blended into component (A) in the method of the present invention, the use is preferred of filler whose surface has been treated with an organosilicon compound such as hexamethyldisilazane, trimethylchlorosilane, or polydimethylsiloxane. When component (A) in the method of the present invention takes the form of an addition-reaction-curable liquid silicone rubber composition, small or trace quantities of, for example, an acetylenic compound, hydrazine compound, triazole compound, phosphine compound, or mercaptan compound can be added in order to control the curing reaction. Furthermore, the following may be added on an optional basis: pigments, heat stabilizers, flame retardants, photosensitizers, and diorganopolysiloxane having silicon-bonded lower alkenyl only at one molecular chain terminal.

Component (B) comprises a nonionic surfactant having an HLB value of less than 10, and this component is exemplified as above by polyoxyethylene nonylphenyl ethers, polyoxyethylene trimethylnonyl ethers, polyoxyethylene sorbitan stearate esters, and the like. Two or more of the preceding may be employed as this component. Since component (B) is less dispersible in water than component (C), the former is preferably preliminarily dispersed in component (A) in the method of the present invention.

Component (C) in the method of the present invention comprises a nonionic surfactant having an HLB value of at least 10, and this component is exemplified as above by polyoxyethylene octylphenyl ethers, polyoxyethylene trimethylnonyl ethers. polyoxyethylene sorbitan stearate esters, and the like. Two or more of the preceding may be employed as this component. The components (B) and (C) employed by the method of the present invention preferably have HLB values which differ by at least 5. Even when a highly concentrated silicone rubber microsuspension is prepared, this will make possible the preparation of microparticulate silicone rubber with a small particle diameter, and, in addition, the silicone rubber microsuspension afforded thereby will have a particularly good storage stability. The total quantity of components (B) plus (C) is not specifically restricted as long as this quantity can lead to the formation of an emulsion of component (A) in the method of the present invention, however 10 to 100 weight parts per 100 weight parts component (A) is preferred and 20 to 50 weight parts per 100 weight parts component (A) is more preferred.

Component (D) in the method of the present invention is the dispersion medium for the silicone rubber microsuspension according to the present invention. In the method of this invention the mixture of components (A) to (D) is converted into a uniform microemulsion of component (A) using an emulsifier such as a colloid mill or homogenizer. At this point, the combined quantity of components (B) plus (C) plus (D) must comprise 1 to 100 weight parts per 100 weight parts component (A). Emulsification is impaired at less than 1 weight part, while at more than 100 weight parts the shearing force in the emulsifier will be inadequate for the generation of a highly concentrated microemulsion of component (A).

The silicone rubber concentration can be freely adjusted in method of the present invention through the addition of component (D) to the high-concentration silicone rubber microsuspension. The silicone rubber microsuspension produced by the method according to the present invention should have a silicone rubber content of at least 50 weight percent, but from the standpoint of practical applications preferably has a silicone rubber content of 50 to 90 weight percent and particularly 50 to 70 weight percent.

Components (A) through (D) may be simultaneously mixed with one another in the method according to the present invention. However it is preferred that component (B) is preliminarily dispersed in component (A), and component (D) (containing dispersed component (C)) is then added and the emulsification is carried out.

In the method according to the present invention, the liquid temperature of the component (A) emulsion is preferably −10° to 90° C. and more preferably 0° to 30° C. The reasons for this are as follows: emulsification in the emulsifier is impaired when the liquid temperature of the emulsion is too low; when the liquid temperature is too high, component (A) undergoes curing prior to its emulsification in the emulsifier, and its emulsification is accordingly precluded.

Since the emulsion of component (A) is itself highly storage stable, when said emulsion is allowed to stand as such at room temperature, the silicone rubber microsuspension is obtained after a short period of time as a result of the gradual development of the curing reaction of component (A). However, the curing time for component (A) can be shortened by heating the emulsion of component (A). The liquid temperature of the component (A) emulsion in such a case preferably does not exceed 100° C. and more preferably does not exceed 80° C. The water will boil when the liquid temperature is too high, thus destabilizing the silicone rubber microsuspension.

The silicone rubber microsuspension according to the present invention as described hereinbefore has an excellent storage stability and can be stored for long periods of time. Moreover, removal of the water fraction from this silicone rubber microsuspension affords a microparticulate silicone rubber. Methods for removing the water from the silicone rubber microsuspension according to the present invention are exemplified by removal of the water from the silicone rubber microsuspension by heating to 100° C. or above and removal of water using an oven or hot-air drier such as a spray drier. Since the microparticulate silicone rubber afforded thereby has an average particle size of 10 micrometers or less, it can be employed as an internal stress-relaxing material for organic resins. In particular, its dispersion into the thermosetting resins widely used as sealants for various types of semiconductor products will provide a stress-relaxing effect vis-a-vis the components, conductors, etc.

EXAMPLES

The present invention is explained below using demonstrative examples and comparison examples, in which the viscosity is the value measured at 25° C.

EXAMPLE 1

A liquid silicone rubber composition was prepared from 50 weight parts dimethylvinylsiloxy-terminated dimethylpolysiloxane (viscosity=400 centipoise), 1.5 weight parts trimethylsiloxy- terminated methylhydrogenpolysiloxane (viscosity=40 centipoise), $7.5 \times 10^{-3}$ weight parts tetramethyltetravinylcyclotetrasiloxane, and isopropanolic chloroplatinic acid solution (120 ppm as platinum metal relative to the total quantity of the preceding). To this was added 0.25 weight parts polyoxyethylene nonylphenyl ether with HLB=5.7. To the resulting mixture was added dropwise, over approximately 5 minutes with stirring, an aqueous solution of 1 weight part polyoxyethylene octylphenyl ether with HLB=18.1 and 10 weight parts pure water. After then stirring at 600 rpm for approximately 1 hour, passage through a colloid mill afforded a viscous emulsion of the liquid silicone rubber composition. This was introduced with stirring into pure water to produce a homogeneous emulsion (50 weight % solids) of the liquid silicone rubber composition. This emulsion was heated at 70° C. for 20 minutes to produce the silicone rubber microsuspension.

A sample of this silicone rubber microsuspension was taken, and the water was removed from the sample at room temperature. A microparticulate silicone rubber was obtained with maximum particle size=5 micrometers and average particle size=1 micrometer. Furthermore, separation of the silicone rubber from the aqueous layer was not observed even after this silicone rubber microsuspension remained at room temperature for 3 months and more.

EXAMPLE 2

A liquid silicone rubber composition was prepared from 50 weight parts dimethylvinylsiloxy-terminated dimethylpolysiloxane (viscosity=400 centipoise), 3.7 weight parts trimethylsiloxy- terminated methylhydrogenpolysiloxane (viscosity=40 centipoise), 2.5 weight parts vinylcyclohexene monoepoxide, $7.5 \times 10^{-3}$ weight parts tetramethyltetravinylcyclotetrasiloxane, and isopropanolic chloroplatinic acid solution (120 ppm as platinum metal relative to the total quantity of the preceding). To this was added 0.25 weight parts polyoxyethylene nonylphenyl ether with HLB=5.7. To the resulting mixture was added dropwise, over approximately 5 minutes with stirring, an aqueous solution of 1 weight part polyoxyethylene octylphenyl ether with HLB=18.1 and 10 weight parts pure water. After then stirring at 600 rpm for approximately 1 hour, passage through a colloid mill afforded a viscous emulsion of the liquid silicone rubber composition. This was introduced with stirring into pure water to produce a homogeneous emulsion (50 weight % solids) of the liquid silicone rubber composition. Maintaining this emulsion at room temperature for at least 15 hours afforded the silicone rubber microsuspension.

This silicone rubber microsuspension was dried using a spray drier to give a microparticulate silicone rubber with maximum particle size=5 micrometers and average particle size=1 micrometer. Furthermore, separation of the silicone rubber from the aqueous layer was not observed even after this silicone rubber microsuspension remained at room temperature for 3 months and more.

COMPARISON EXAMPLE 1

A silicone rubber microsuspension was prepared as in Example 1, but in the present case omitting the polyoxyethylene nonylphenyl ether used in Example 1. After the resulting silicone rubber microsuspension had stood for 1 day at room temperature, lumps of silicone rubber were separated from the aqueous layer.

COMPARISON EXAMPLE 2

A silicone rubber microsuspension was prepared as in Example 2, but in the present case omitting the polyoxyethylene nonylphenyl ether used in Example 2. A sample of this silicone rubber microsuspension was taken, and the water was removed from the sample at room temperature. A silicone rubber was obtained with maximum particle size=500 micrometers and average particle size=100 micrometers. The silicone rubber separated from the aqueous layer when the silicone rubber microsuspension remained at room temperature for 1 day.

EXAMPLE 3

A liquid silicone rubber composition was prepared from 50 weight parts dimethylvinylsiloxy-terminated dimethylpolysiloxane (viscosity=400 centipoise), 1.5 weight parts trimethylsiloxy- terminated methylhydrogenpolysiloxane (viscosity=40 centipoise), $7.5 \times 10^{-3}$ weight parts tetramethyltetravinylcyclotetrasiloxane, and isopropanolic chloroplatinic acid solution (120 ppm as platinum metal relative to the total quantity of the preceding), Into this was dripped over approximately 5 minutes with stirring an aqueous solution of 0.25 weight parts polyoxyethylene nonylphenyl ether with HLB=5.7, 1 weight part polyoxyethylene octylphenyl ether with HLB=18.1, and 10 weight parts pure water. After then stirring at 600 rpm for approximately 1 hour, passage through a colloid mill afforded a viscous emulsion of the liquid silicone rubber composition. This was introduced with stirring into pure water to produce a homogeneous emulsion (50 weight % solids) of the liquid silicone rubber composition. This emulsion was heated at 70° C. for 20 minutes to produce the silicone rubber microsuspension.

A sample of this silicone rubber microsuspension was taken, and the water was removed from the sample at room temperature: a microparticulate silicone rubber was obtained with maximum particle size=5 micrometers and average particle size=1 micrometer. Furthermore, separation of the silicone rubber from the aqueous layer was not observed even after this silicone rubber microsuspension remained at room temperature for 3 months and more.

EXAMPLE 4

A liquid silicone rubber composition was prepared from 50 weight parts dimethylvinylsiloxy-terminated dimethylpolysiloxane (viscosity=400 centipoise), 1.5 weight parts trimethylsiloxy- terminated methylhydrogenpolysiloxane (viscosity=40 centipoise), $7.5 \times 10^{-3}$ weight parts tetramethyltetravinylcyclotetrasiloxane, and isopropanolic chloroplatinic acid solution (120 ppm as platinum metal relative to the total quantity of the preceding). Into this was dripped over approximately 5 minutes with stirring an aqueous solution of 0.25 weight parts polyoxyethylene nonylphenyl ether with HLB= 5.7, 1 weight part polyoxyethylene Octylphenyl ether with HLB=18.1, and 47.5 weight parts pure water. After then stirring at 600 rpm for approximately 30 minutes, processing in an homogenizer afforded a uniform emulsion of the liquid silicone rubber composition. This emulsion was heated at 70° C. for 20 minutes to produce the silicone rubber microsuspension.

A sample of this silicone rubber microsuspension was taken, and the water was removed from the sample at room temperature. A microparticulate silicone rubber was obtained with maximum particle size=5 micrometers and average particle size=1 micrometer. Furthermore, separation of the silicone rubber from the aqueous layer was not observed even after this silicone rubber microsuspension remained at room temperature for 3 months and more.

EXAMPLE 5

A liquid silicone rubber composition was prepared from 50 weight parts dimethylvinylsiloxy-terminated dimethylpolysiloxane (viscosity=400 centipoise), 1.5 weight parts trimethylsiloxy- terminated methylhydrogenpolysiloxane (viscosity=40 centipoise), $7.5 \times 10^{-3}$ weight parts tetramethyltetravinylcyclotetrasiloxane, and isopropanolic chloroplatinic acid solution (120 ppm as platinum metal relative to the total quantity of the preceding). To this composition was added 0.25 weight parts polyoxyethylene nonylphenyl ether with HLB=5.7. To the resulting mixture was added dropwise, over approximately 5 minutes with stirring, an aqueous solution of 1 weight part polyoxyethylene trimethylnonyl ether with HLB=14.1 and 10 weight parts pure water. After then stirring at 600 rpm for approximately 1 hour, passage through a colloid mill afforded a viscous emulsion of the liquid silicone rubber composition. This was introduced with stirring into pure water to produce a homogeneous emulsion (50 weight % solids) of the liquid silicone rubber composition. This emulsion was heated at 70° C. for 20 minutes to produce the silicone rubber microsuspension.

A sample of this silicone rubber microsuspension was taken, and the water was removed from the sample at room temperature. A microparticulate silicone rubber was obtained with maximum particle size=5 micrometers and average particle size=1 micrometer. Furthermore, separation of the silicone rubber from the aqueous layer was not observed even after this silicone rubber microsuspension had stood at room temperature for 3 months and more.

Because the silicone rubber microsuspension according to the present invention is composed of components (A) through (D) and in particular because it employs nonionic surfactants with specific HLB values as its components (B) and (C), said silicone rubber microsuspension is characterized in that its silicone rubber is a microparticulate with an average particle size not exceeding 10 micrometers and in that it has an excellent storage stability despite its high silicone rubber content. In addition, the method according to the present invention can efficiently produce the silicone rubber microsuspension.

That which is claimed is:

1. A silicone rubber microsuspension composition comprising:
    (A) a microparticulate silicone rubber having an average particle diameter not exceeding 10 micrometers;
    (B) a nonionic surfactant having an HLB value of less than 10;
    (C) a nonionic surfactant having an HLB value of at least 10; and
    (D) water;
with the proviso that component (A) comprises at least 50 weight percent of the total composition.

2. A composition according to claim 1 wherein component (B) and component (C) have an HLB differential of at least 5.

3. A composition according to claim 1 wherein component (B) is a compound selected from the group consisting of polyoxyethylene nonylphenyl ethers, polyoxyethylene trimethylnonyl ethers, and polyoxyethylene sorbitan stearate esters.

4. A composition according to claim 1 wherein component (C) is a compound selected from the group consisting of polyoxyethylene octylphenyl ethers, polyoxyethylene trimethylnonyl ethers, and polyoxyethylene sorbitan stearate esters.

5. A method for preparation of a silicone rubber microsuspension, said method comprising the steps of:
    (I) mixing:
        (A) a liquid silicone rubber composition;
        (B) a nonionic surfactant having an HLB value of less than 10;
        (C) a nonionic surfactant having an HLB value of at least 10; and
        (D) water;
wherein the amount of components (B) plus (C) plus (D) is from 1 to 100 weight parts per 100 weight parts of component (A);

(II) forming an emulsion of said liquid silicone rubber composition; and (III) curing the emulsion of said liquid silicone rubber composition.

6. A method according to claim 5 wherein component (A) comprises:
   (a) an organopolysiloxane having at least 2 silicon-bonded lower alkenyl groups in each molecule;
   (b) an organohydrogenpolysiloxane having at least 2 silicon-bonded hydrogen atoms in each molecule; and
   (c) a platinum-type catalyst.

7. A method according to claim 6 wherein the lower alkenyl groups are selected from the group consisting of vinyl, allyl, propenyl, butenyl, pentenyl, hexenyl, and decenyl.

8. A method according to claim 6 wherein component (c) is selected from the group consisting of chloroplatinic acid, chloroplatinic acid alcohol solutions, chloroplatinic acid-aliphatically unsaturated hydrocarbon complexes, chloroplatinic acid- alkenylsiloxane complexes, platinum black, and platinum-on-silica.

9. A method according to claim 6 wherein component (A) additionally comprises an organic compound having in its molecule at least one group selected from the group consisting of epoxy and aryl groups.

10. A method according to claim 5, wherein component (B) is a compound selected from the group consisting of polyoxyethylene nonylphenyl ethers, polyoxyethylene trimethylnonyl ethers, and polyoxyethylene sorbitan stearate esters.

11. A method according to claim 5, wherein component (C) is a compound selected from the group consisting of polyoxyethylene octylphenyl ethers, polyoxyethylene trimethylnonyl ethers, and polyoxyethylene sorbitan stearate esters.

12. A composition according to claim 1, wherein component (A) comprises:
    (a) an organopolysiloxane having at least 2 silicon-bonded lower alkenyl groups in each molecule;
    (b) an organohydrogenpolysiloxane having at least 2 silicon-bonded hydrogen atoms in each molecule; and
    (c) a platinum catalyst.

13. A composition according to claim 12, wherein the lower alkenyl groups are selected from the group consisting of vinyl, allyl, propenyl, butenyl, pentenyl, hexenyl, and decenyl.

14. A composition according to claim 12, wherein component (c) is selected from the group consisting of chloroplatinic acid, chloroplatinic acid alcohol solutions, chloroplatinic acid-aliphatically unsaturated hydrocarbon complexes, chloroplatinic acid- alkenylsiloxane complexes, platinum black, and platinum-on-silica.

15. A composition according to claim 1, wherein component (A) additionally comprises an organic compound having in its molecule at least one group selected from the group consisting of epoxy and aryl groups.

16. A composition according to claim 12, wherein component (A) additionally comprises (d) an organic compound having in its molecule at least one group selected from the group consisting of epoxy and aryl groups.

17. A composition according to claim 16, wherein the organic compound is a compound selected from the group consisting of allyl glycidyl ether, vinylcyclohexene monoepoxide, glycidyl acrylate, and glycidyl methacrylate.

18. A composition according to claim 12, wherein the composition further comprises a filler.

19. A composition according to claim 18, wherein the filler is a filler having its surface treated with an organosilicon compound selected from the group consisting of hexamethyldisilazane, trimethylchlorosilane, and polydimethylsiloxane.

20. A composition according to claim 18, wherein the filler is selected from the group consisting of precipitated silica, fumed silica, calcined silica, fumed titanium oxide, powdered quartz, diatomaceous earth, asbestos, aluminosilicic acid, iron oxide, zinc oxide, and calcium carbonate.

* * * * *